UNITED STATES PATENT OFFICE.

HEINRICH KAYSER, OF DARMSTADT, GERMANY.

COMPOSITION OF MATTER TO BE USED FOR MAKING ACID-PROOF CEMENT.

964,164.  Specification of Letters Patent.  Patented July 12, 1910.

No Drawing.  Application filed July 2, 1908.  Serial No. 441,542.

*To all whom it may concern:*

Be it known that I, HEINRICH KAYSER, a subject of the German Emperor, and resident of Darmstadt, Germany, have invented a new and Useful Composition of Matter to be Used for Making Acid-Proof Cement, of which the following is a specification.

In the employment of Portland cement for cement and concrete constructions the drawback occurs that the Portland-cement is strongly decomposed when coming in touch with acids, especially with sulfuric acid. Said drawback results from the presence in the cement mortar of a surplus of calcium hydroxid or of carbonate of calcium which ingredients under the influence of acids are converted into soluble salts whereby the firmness of the mortar is decreased. If these salts are washed-off by water, the mortar or concrete loses still more of its firmness.

The present invention consists in that to finished Portland-cement the waste products of the manufacture of sulfate of alumina, which contain 70 to 90% of $SiO_2$ and 30 to 10% of $Al_2O_3$, are added, whereby an entirely new composition of matter for the purpose intended is obtained, said purpose being to make the cement mortar firm and acidproof by the employment of the improved composition of matter. The above-defined agent is added to the ordinary Portland-cement in dry condition and in quantities of 10 to 30 parts of weight of the cement, said quantity depending on the purpose for which the cement is intended and on the firmness required. By the addition of the agent named, upon combining part of the surplus of lime is converted into insoluble silicium-containing compounds and the formation of the above-mentioned soluble salts is reduced to a considerable degree. In this way the cement mortar gains firmness and becomes acidproof.

Having fully described my invention, what I claim and desire to secure by Letters Patent is:—

The herein described composition of matter for making acidproof cement, consisting of finished Portland-cement and the silicium-containing waste products of the manufacture of sulfate of alumina ($SiO_2Al_2O_3$) in dry condition and in quantities of up to 30 parts of weight of the cement, substantially as described.

In testimony whereof I have hereunto set my hand in the presence of two subscribing witnesses.

HEINRICH KAYSER.

Witnesses:
 WILHELM BEIKER,
 WALTER HANSEN.